United States Patent [19]

Oikawa et al.

[11] 4,233,927
[45] Nov. 18, 1980

[54] INSTRUMENT ASSEMBLY WITH ILLUMINATED METER MOUNTING PANEL

[75] Inventors: Akio Oikawa, Yokosuka; Koji Sasai, Yokohama, both of Japan

[73] Assignee: Nissan Motor Company, Limited, Yokohama, Japan

[21] Appl. No.: 49,450

[22] Filed: Jun. 18, 1979

[30] Foreign Application Priority Data

Jun. 21, 1978 [JP] Japan .................................. 53-74137

[51] Int. Cl.³ ...................... G01D 11/28; G05D 25/02
[52] U.S. Cl. .................................... 116/287; 315/291; 362/26
[58] Field of Search .................... 116/48, 49, 286, 287; 362/26, 27, 28, 23, 251

[56] References Cited

U.S. PATENT DOCUMENTS

| | | | |
|---|---|---|---|
| 2,654,020 | 9/1953 | Pittman | 362/27 |
| 2,843,079 | 7/1958 | Hunter et al. | 116/288 |
| 2,861,537 | 11/1958 | Kadlec | 116/288 |
| 2,907,869 | 10/1959 | Hudson et al. | 116/287 X |
| 2,918,034 | 12/1959 | Neugass | 116/287 |
| 2,980,056 | 4/1961 | Achilich | 116/286 X |
| 3,131,670 | 5/1964 | Hardesty | 116/287 X |
| 3,143,098 | 8/1964 | Blackwell | 362/27 X |
| 3,264,769 | 8/1966 | Hardesty | 116/287 X |
| 3,278,740 | 10/1966 | Madansky | 362/27 |
| 3,514,940 | 6/1970 | Keane, Jr. et al. | 362/26 X |
| 3,699,915 | 10/1972 | Greene | 362/26 |

FOREIGN PATENT DOCUMENTS 2611434 9/1977 Fed. Rep. of Germany .......... 116/287

Primary Examiner—Daniel M. Yasich
Attorney, Agent, or Firm—Schwartz, Jeffery, Schwaab, Mack, Blumenthal & Koch

[57] ABSTRACT

A meter mounting panel having an opening through which a dial board of a meter is exposed is made of a transparent material and has a light reflecting surface formed thereon. An edge of the panel is located in the vicinity of a light source so that the light from the light source enters the panel through the edge and is reflected on the reflecting surface to be directed in a direction parallel to the surface of the panel thereby to illuminate the same from within.

10 Claims, 7 Drawing Figures

INSTRUMENT ASSEMBLY WITH ILLUMINATED METER MOUNTING PANEL

FIELD OF THE INVENTION

The present invention relates in general to an instrument assembly mounted on a dashboard of a motor vehicle or the like, and more particularly to a lighting arrangement for the instrument assembly.

BACKGROUND OF THE INVENTION

In conventional instrument assemblies, a meter mounting panel which covers the front section of the assembly except portions where dial boards of the meters are exposed is constructed of an opaque material such as a darkly colored plastic and is not illuminated in any way. Thus, the instrument assembly as a whole tends to give a gloomy impression. Further, a problem with such an opaque panel is that it appears black in the nighttime, even if it is offered in a relatively bright color, presenting a totally different contrast in color and illumination to the meters, compared with the contrast in the daytime.

SUMMARY OF THE INVENTION

It is therefore an object of the present invention to solve the above-mentioned problems.

It is an object of the present invention to provide an instrument assembly which gives the meter mounting panel much the same color and illumination in the nighttime as in the daytime.

It is another object of the present invention to provide an instrument assembly having a meter mounting panel which is constructed of a transparent material and is illuminated from within by the light which enters the panel through edges of the same.

Other objects and advantages of the present invention will become clear from the following description when taken in conjunction with the accompanying drawings.

DESCRIPTION OF THE EMBODIMENTS

Figure 1:
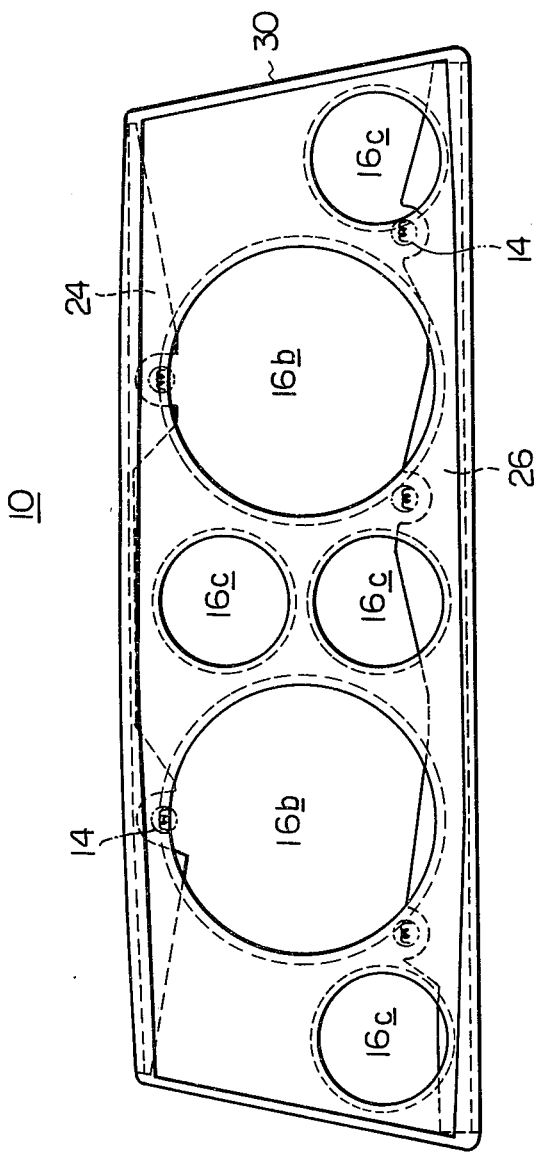
FIG. 1 is a front view of an instrument assembly of a first embodiment of the invention, with meters being removed for clarification of the drawing.
Figure 2:
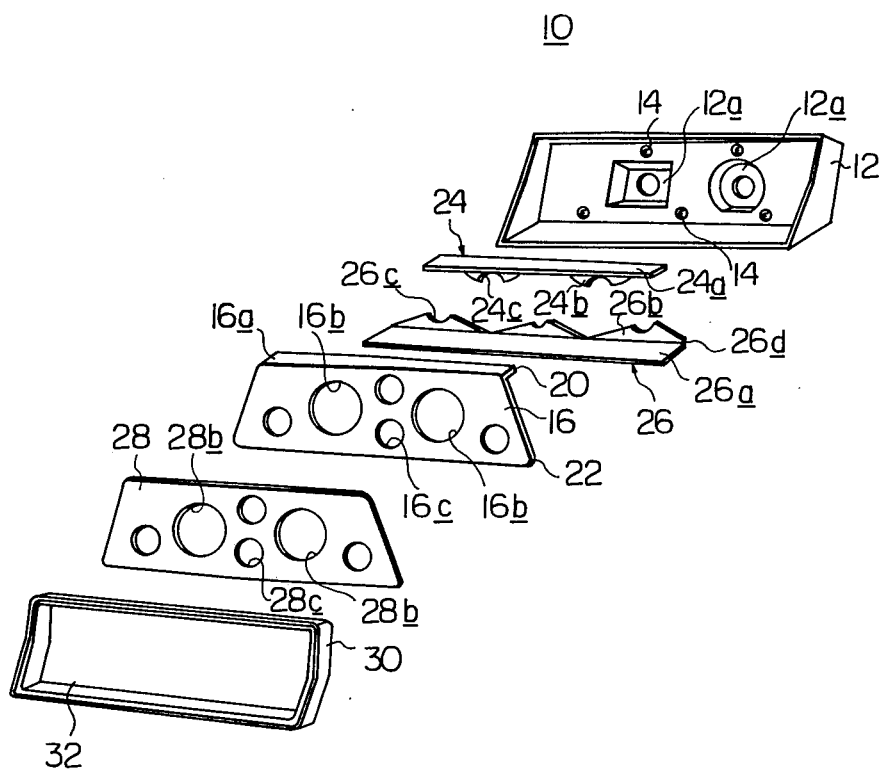
FIG. 2 is an exploded perspective view of the instrument assembly of FIG. 1.
Figure 3:
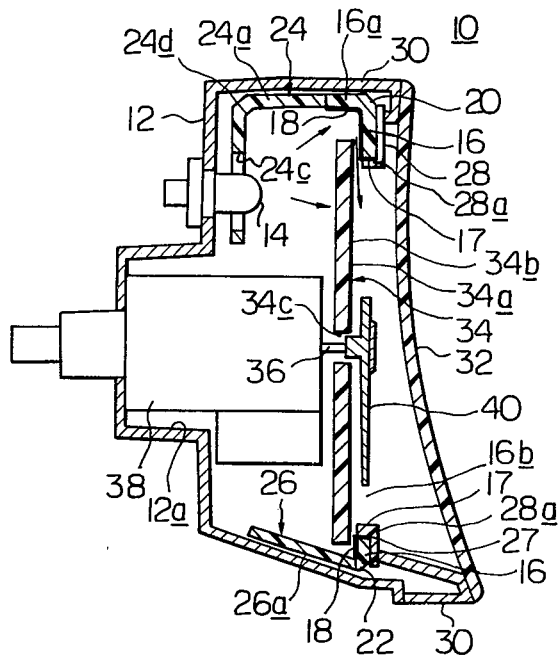
FIG. 3 is a cross-sectional view of the instrument assembly of FIG. 1 at a position where a meter is installed.
Figure 4:
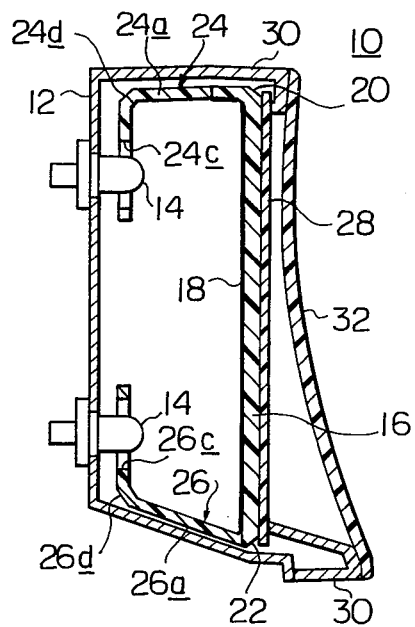
FIG. 4 is a cross-sectional view of the instrument assembly of FIG. 1 at a position where a meter is not installed.

Referring to FIGS. 1 to 4, there is shown a first embodiment 10 of the instrument assembly in accordance with the present invention. As is best seen from FIG. 2, the instrument assembly 10 comprises a meter housing 12 having depressions 12a in which movements of meters (not shown) are disposed. Equipped on the inboard surface of the meter housing 12 are lamps 14 for lighting. A meter mounting panel 16 which is constructed of a transparent material such as acrylic resin is mounted in the meter housing 12 to form a given space between the inboard surface of the housing 12 and the panel 16, as is understood from FIGS. 3 and 4. The meter mounting panel 16 has a flange 16a at its upper section and is formed with larger openings 16b which surround the dial portions of larger meters such as the speedometer and tachometer, and smaller openings 16c which surround the dial portions of smaller meters such as the voltmeter, cooling water temperature gauge and fuel gauge. As is seen in FIGS. 3 and 4, the back surface of the panel 16 is coated with white or whitey opaque paint 18. Preferably, the paint layer 18 is made finely irregularly in order to diffuse evently the light coming thereto. The upper portion of the panel 16 from which the flange 16a extends and the lower end of the panel 16 are formed therealong with slanted light reflecting surfaces 20 and 22 which are constructed to reflect the light coming from the left in the drawing in a direction parallel to the surface of the panel 16. The peripheral portions of the openings 16b and 16c (see FIG. 2) are covered with dark opaque paint layers 17 for reasons which will become apparent hereinafter.

Designated by numerals 24 and 26 are light guiding members made of a transparent material, each consisting of a base flat section 24a or 26a and wave-shaped flange section 24 or 26b. Each flange section is formed with a rounded recess 24c or 26c at the top thereof, as is best seen from FIG. 2, and is formed with a slanted light reflecting surface 24d or 26d at a joint part where the base flat section 24a or 26a and the flange section 24b or 26b are integrally connected, as is seen from FIGS. 3 and 4. These light guiding members 24 and 26 are mounted respectively in the upper and lower portions of the interior of the meter housing 12 between the housing 12 and the panel 16 in such an arrangement that each rounded recess 24c and 26c half surrounds one of the lamps 14, and the lateral edges of the base flat sections 24a and 26a thereof are in contact with the leading end of the flange 16a and the lower end of the panel 16, respectively, as is understood from FIGS. 3 and 4. The front surface of the panel 16 is covered with a colored transparent plate 28 made of for example a grayish or blackish color plate and is formed with collared openings 28b and 28c at positions corresponding to the openings of the panel 16. The collars which are designated by numerals 28a in FIGS. 3 and 4 are snugly coupled in the corresponding openings 16b and 16c of the panel 16 for rimming the same upon attaching of the plate 28 on the panel 16. A front frame 30 to which a front cover 32 made of a transparent glass or the like is fixed is mounted to the front of the meter housing 10.

As is seen from FIG. 3, a dial board designated by 34 is disposed behind the meter panel 16 at a position to face the opening 16b of the panel 16. The dial board 34 is made of a clear transparent plate 34a with a top layer of an opaque paint 34b. The markings on the dial board 34 are cut through the paint 34b so that the light from the lamps 14 emerges only through the engraved indicia and numerals. The dial board 34 has an opening 34c through which a spindle 36 extending from the movement 38 spacedly passes. An indicator pointer 40 is fixed at its hub portion to the leading end of the spindle 36 so that the pointer 40 moves over the face of the dial board 34 in response to rotation of the spindle 36. As shown, a given amount of space is provided between the dial board 34 and the meter mounting panel 16 so that the light from the lamps 14 can pass therethrough for illumination of the pointer 40 indirectly in a manner as indicated by arrows in FIG. 3.

With the above-stated construction, the light from the lamps 14 enters the light guiding members 24 and 26 through the edges thereof which define the rounded recesses 24c and 26c, and is reflected on the reflecting surfaces 24d and 26d to be directed in the directions parallel to the surfaces of the base flat sections 24a and 26a. The light then enters the meter mounting panel 16 and is then reflected on the slanted light reflecting surfaces 20 and 22 of the panel 16 to be directed in the directions parallel to the surface of the panel 16. The light thus entering the panel 16 is diffusibly reflected by the opaque paint 18 coated on the panel 16 to illuminate the colored transparent plate 28 which covers the panel 16. Thus, the entire surface of the meter mounting panel 16 is viewed through the front cover 32 as being illuminated in a desired illumination and color. The indicia and numerals marked on the dial board 34 are illuminated directly by the light coming from the lamps 14.

In addition to the above described construction, the following modifications are available according to the invention.

If the opaque paint 18 on the back surface of the panel 16 is colored to play a dual role of reflection and coloring, the colored transparent plate 28 is unnecessary. In this case, however, the top surface of the panel 16 should be roughly finished to prevent it from acting as a mirror against the external light. (When the colored transparent plate 28 is employed, it is also desirable to give the plate 28 a rough top surface for the same reason as mentioned.) The plate 28 may be formed in one piece with the frame 30, and further the plate 28 may be substituted by a transparent paint film. However, in the latter case, the film should have an even thickness throughout to ensure even brightness.

It should be noted that since the peripheral portion of the opening 16b or 16c of the meter mounting panel 16 is covered by the dark opaque paint 17 and also covered by the collar 28a of the colored transparent plate 28, the dial board 34 positioned behind the opening 16b or 16c stand out and gives the whole of the panel 16 a pleasant appearance.

Figure 5:
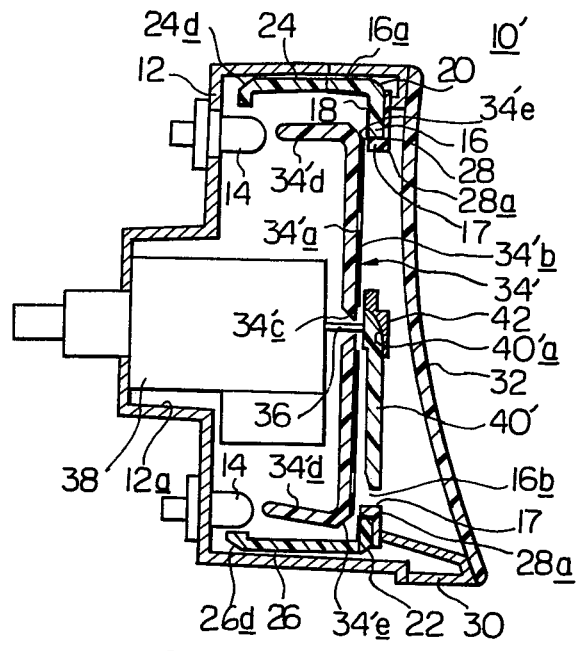
FIG. 5 is a view similar to FIG. 3, but shows a second embodiment of the invention.

Referring to FIG. 5 of the drawings, there is shown a second embodiment of the invention. The instrument assembly 10' of this embodiment is similar in construction to that of the first embodiment except for the construction of the dial board and the pointer. For simplification of the description and drawing, substantially the same parts will be denoted by the same numerals as in the case of the first embodiment and detailed explanation of those will be omitted from the following.

The dial board 34' of the second embodiment is also made of a clear transparent plate 34'a with a top layer of an opaque paint 34'b. The indicia and numerals are provided by partially engraving only the paint 34'b. The transparent plate 34'a is formed at its peripheral portions with a suitable number of extensions 34'd projecting toward the neighboring lamps 14. A slanted light reflecting surface 34'e is formed on each connecting part where the extension 34'c and the plate 34'a are integrally connected, and further the opening 34'c of the dial board 34' is formed into a conical shape bounded by a frusto-conical surface with an apex of the surface pointing toward the hub portion of the pointer 40'. A portion of the plate 34'a where the conical opening 34'c is positioned is not covered with the opaque paint 34'b.

The pointer 40' is made of a transparent material and has at the hub portion thereof a cap 42. As will be understood from the drawing, the hub portion of the pointer 40' is formed with a curved light reflecting surface 40'a at a portion covered by the cap 42.

With the above-stated construction of the second embodiment, the light from the lamps 14 enters the extensions 34'd of the plate 34' and is reflected on the surfaces 34'e to be directed in the directions parallel to the surface of the dial board 34' toward the conical opening 34'c for illumination of the engraved indicia and numerals of the dial board 34'. The light directed toward the conical opening 34'c is then reflected on the frusto-conical surface of the opening 34'c to be directed toward the hub portion of the pointer 40' and enters the hub portion and is then reflected on the curved reflecting surface 40'a to be directed toward the top of the pointer 40'. Thus, the pointer 40' is also illuminated from within.

With this second embodiment, more effective use of the light from the light source is achieved as the light is more positively used for illumination of the indicia and the numerals on the dial board 34' and the pointer 40'.

Figure 6:
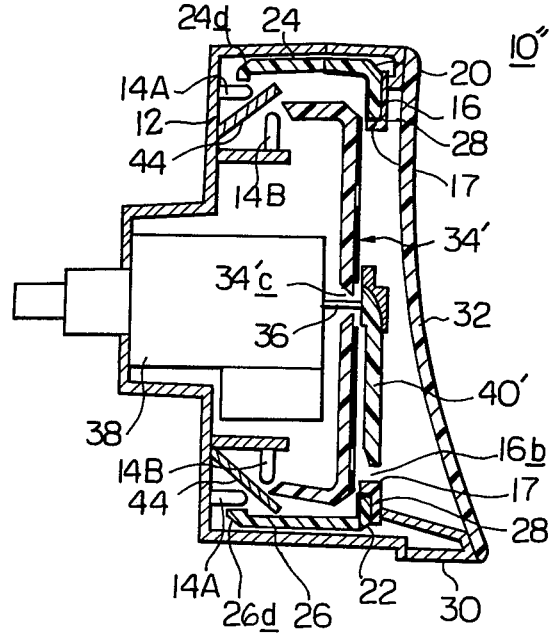
FIG. 6 is a view similar to FIG. 3, but shows a third embodiment of the invention.
Figure 7:
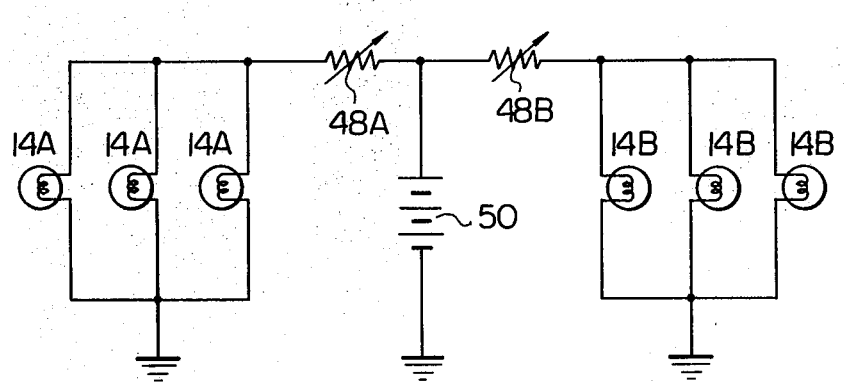
FIG. 7 is a dimmer circuit used in the instrument assembly of the third embodiment.

Referring to FIGS. 6 and 7, especially FIG. 6, there is shown a third embodiment 10'' of the invention which is very similar in construction to the second embodiment. Thus, substantially the same parts will be denoted by the same numerals as in the second embodiment (FIG. 5) and the detailed explanation of those will be omitted from the following.

In the third embodiment, the contrast in brightness between the meter mounting panel 16 and the dial board 34' is freely regulated.

For this, first and second groups of lamps 14A and 14B are used, the former being for illuminating only the panel 16 and the latter for illuminating only the indicia and numerals of the dial board 34', and the pointer 40' and partition members 44 are arranged in the housing 12 to define two spaces, one of which is for the light from the first group of lamps 14A to the light inlet portions of the light guiding members 24 and 26, and the other of which for the light from the second group of lamps 14B to the extensions 34'd of the dial board 34'. A dimmer circuit 46 for controlling voltage applied to the first and second groups of lamps 14A and 14B is shown in FIG. 7. The circuit 46 comprises two variable resistors 48A and 48B which are interconnected between an electric power source 50 and the lamps 14A and between the power source 50 and the lamps 14B, respectively, as shown. Thus, by regulating the variable resistors 48A and 48B, the intensity in brightness of the first group of lamps 14A and that of the second group of lamps 14B are changed, thus changing the contrast in illumination between the panel 16 and the indicia of the dial board 34' and the pointer 40'.

In addition, the use of photoconductive cells such as a CdS cell for the variable resistors 48A and 48B or the adoption of a dimmer circuit employing an optoelectro transducer, such as a photo diode, makes it possible to change the intensity of illumination of the panel 16, the indicia of the dial board 34' and the pointer 40' automatically in accordance with the external light and also to automatically regulate the contrast between the panel 16 and the indicia of the dial board 34' and the pointer 40'.

What is claimed is:
1. An instrument assembly, comprising:
a casing having a generally open front side;

at least one meter movement disposed in said casing;

a spindle extending from said movement toward the front side of said casing and being rotatable about the axis thereof;

a dial board disposed in said casing in front of said meter movement and having a front face facing the front side of said casing, said front face having indicia thereon and an opening therein through which said spindle passes;

a pointer having a hub portion fixed to said spindle so as to move over the front face of said dial board in response to rotation of said spindle;

a meter mounting panel having a rear edge and a front portion, said front portion positioned in said casing in front of said dial board and having an opening through which the front face of said dial board is exposed, said panel being constructed of a transparent material;

an opaque layer covering at least a portion of the face of said panel which faces away from the front side of said casing;

at least one light source located in said casing at a position to the rear of said dial board for producing light;

a light guiding member which is constructed of a transparent material and is located with respect to said light source and said rear edge of said panel so as to transmit the light from said light source to the edge of said panel; and means formed on said panel for reflecting the light which has entered the edge of said panel in a direction parallel to the front face of said panel, whereby the reflected light travels in said panel to illuminate the entire of said panel from within.

2. An instrument assembly as claimed in claim 1, in which said light reflecting means comprises a slanted flat surface formed at the edge of said meter mounting panel to provide for internal reflection of light entering the edge of said meter mounting panel from said light guiding member.

3. An instrument assembly as claimed in claim 1, further comprising a colored transparent plate which covers the front face of said meter mounting panel.

4. An instrument assembly as claimed in claim 3, in which said colored transparent plate is formed with a collared opening, the collar being snugly fixed in the opening of said meter mounting panel in a manner to rim the same upon attachment of said plate to said panel.

5. An instrument assembly as claimed in claim 4, in which the peripheral portion of the opening of said meter mounting panel is covered with an opaque layer.

6. An instrument assembly as claimed in claim 1, in which said dial board comprises a transparent plate having an opaque surface layer, said surface layer being partially cut for providing engraved indicia on said dial board.

7. An instrument as claimed in claim 6, in which said transparent plate of the dial board comprises a transparent extension projecting toward said light source for receiving therein the light from said light source, and light reflecting means for reflecting the light entering said extension in a direction parallel to the surface of said dial board thereby to illuminate the engraved indicia on said dial board.

8. An instrument assembly as claimed in claim 7, further comprising pointer illuminating means for illuminating the entire of the pointer which is made of a transparent material, said pointer illuminating means comprising a frusto-conical surface bounding said opening of said dial board, said surface having an apex pointing toward said hub portion of said pointer and a curved surface formed on said hub portion for reflecting the light coming thereinto from said frustoconical surface toward the top of said pointer.

9. An instrument assembly as claimed in claim 8, further comprising a cap on the hub portion of said pointer.

10. An instrument assembly as claimed in claim 7, further comprising dimmer means for independently changing the degree of illumination between the meter mounting panel and the engraved indicia on the dial board, said dimmer means comprising said light source as a first light source and a second light source, a partition member arranged between said first and second light sources to define a first space containing said first light source for illuminating the end of said meter mounting panel, and a second space containing said second light source for independently illuminating an end of said extension of said transparent plate of the dial board, and control means for independently controlling the intensity of brightness of said first and second light sources.

* * * * *